US009509589B2

(12) United States Patent
Tanizawa et al.

(10) Patent No.: US 9,509,589 B2
(45) Date of Patent: Nov. 29, 2016

(54) COMMUNICATION DEVICE, COMMUNICATION SYSTEM, COMMUNICATION METHOD, AND COMPUTER PROGRAM PRODUCT

(71) Applicant: Kabushiki Kaisha Toshiba, Minato-ku (JP)

(72) Inventors: Yoshimichi Tanizawa, Yokohama (JP); Hideaki Sato, Yokohama (JP); Ririka Takahashi, Setagaya-ku (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/183,882

(22) Filed: Feb. 19, 2014

(65) Prior Publication Data

US 2014/0289520 A1 Sep. 25, 2014

(30) Foreign Application Priority Data

Mar. 25, 2013 (JP) ................................. 2013-062935

(51) Int. Cl.
*H04L 29/06* (2006.01)
*H04L 12/721* (2013.01)

(52) U.S. Cl.
CPC ............. *H04L 45/14* (2013.01); *H04L 63/061* (2013.01); *H04L 45/12* (2013.01)

(58) Field of Classification Search
CPC ....... H04L 45/14; H04L 45/12; H04L 63/04; H04L 63/18; G06F 21/60; G06F 21/606
USPC .................. 713/168, 153; 709/238
See application file for complete search history.

(56) References Cited

U.S. PATENT DOCUMENTS

| | | | | |
|---|---|---|---|---|
| 5,764,765 A * | 6/1998 | Phoenix | ................ | H04L 9/0858 380/256 |
| 6,631,136 B1 * | 10/2003 | Chowdhury et al. | .... | 370/395.31 |
| 6,829,238 B2 * | 12/2004 | Tokuyo | ............. | H04L 29/12009 370/392 |
| 7,908,481 B1 * | 3/2011 | Donzis | .............. | H04L 29/12367 380/227 |
| 8,995,301 B1 * | 3/2015 | Miller | ................... | H04L 45/121 370/254 |
| 2001/0015976 A1 * | 8/2001 | Harasawa | ............... | H04L 45/00 370/391 |
| 2006/0268934 A1 * | 11/2006 | Shimizu et al. | ............... | 370/473 |
| 2007/0195700 A1 * | 8/2007 | Katoh et al. | .................. | 370/235 |
| 2007/0263544 A1 * | 11/2007 | Yamanaka et al. | ........... | 370/238 |
| 2008/0285458 A1 * | 11/2008 | Lysne | ........................... | 370/238 |

(Continued)

FOREIGN PATENT DOCUMENTS

JP 2008-154019 7/2008

OTHER PUBLICATIONS

U.S. Appl. No. 14/036,208, filed Sep. 25, 2013, Ririka Takahashi, et al.
O. Maurhart, "QKD Networks Based on Q3P", Applied Quantum Cryptography, Lect. Notes Phys., vol. 797, Chapter 8, 2010, pp. 151-171.
Mehrdad Dianati, et al., "Architecture and protocols of the future European quantum key distribution network", Security and Communication Networks, vol. 1, 2008, pp. 57-74.
"Virtual Routing and Forwarding", Cisco Active Network Abstraction 3.7 Reference Guide, Chapter 11, 1998-2010, 6 pages.
Japanese Office Action mailed Aug. 9, 2016 in Japanese Patent Application No. 2013-062935 with computer-generated translation.
Juniper Networks, An Essential U.S. Government Agency Transit on Guide to IPv6 Routing and Addressing, the IPv6 World Report Series, vol. 3, Jun. 2007.

*Primary Examiner* — Sarah Su
(74) *Attorney, Agent, or Firm* — Oblon, McClelland, Maier & Neustadt, L.L.P.

(57) ABSTRACT

According to an embodiment, a communication device is connected to a first network and a second network. The communication device includes a generating unit and a converting unit. The generating unit is configured to generate a first set of route information that is route information of the first network. The converting unit is configured to convert the first set of route information, and generate a second set of route information that is route information of the second network.

9 Claims, 4 Drawing Sheets

(56) References Cited

U.S. PATENT DOCUMENTS

| | | | |
|---|---|---|---|
| 2009/0043911 A1* | 2/2009 | Flammer et al. | 709/238 |
| 2009/0046732 A1* | 2/2009 | Pratt et al. | 370/406 |
| 2010/0088427 A1* | 4/2010 | Mo et al. | 709/241 |
| 2010/0118874 A1* | 5/2010 | Li | 370/389 |
| 2011/0320400 A1* | 12/2011 | Namini | 707/610 |
| 2013/0107729 A1* | 5/2013 | Wagner et al. | 370/252 |
| 2013/0160086 A1* | 6/2013 | Katar | H04L 63/08 726/4 |
| 2013/0208894 A1* | 8/2013 | Bovino | H04L 9/0883 380/278 |
| 2013/0242996 A1* | 9/2013 | Varvello et al. | 370/392 |

\* cited by examiner

COMMUNICATION DEVICE, COMMUNICATION SYSTEM, COMMUNICATION METHOD, AND COMPUTER PROGRAM PRODUCT

CROSS-REFERENCE TO RELATED APPLICATION

This application is based upon and claims the benefit of priority from Japanese Patent Application No. 2013-062935, filed on Mar. 25, 2013; the entire contents of which are incorporated herein by reference.

FIELD

Embodiments described herein relate generally to a communication device, a communication system, a communication method, and a computer program product.

BACKGROUND

In a key generating and sharing system, two networks (namely, a key sharing network and an application network) are present. The key sharing network is configured with a plurality of networked nodes which is mutually connected by a plurality of links. Each node has the function of generating and sharing a random number with opposite nodes that are connected by links, as well as has the function of performing cryptographic communication over the link by using the random number as a cryptographic key (hereinafter, referred to as "a link key"). Moreover, some of the nodes also have the function of generating another cryptographic key (hereinafter, referred to as "an application key"), which is a random number, independent of the links; as well as have the function of sending the application key to a different node via links.

An application has the function of obtaining an application key from a node; using that application key as a cryptographic key; and performing cryptographic communication with another application. At that time, the cryptographic data communication can be performed using a network (an application network), such as the Internet, that is different from the key sharing network. Meanwhile, applications and nodes can be configured in an integrated manner. Alternatively, applications and nodes can be configured as terminals independent of each other, and application keys can be sent and received among them.

In a node, the function of generating a random number (a link key) and sharing it with opposite nodes that are connected by links can also be implemented using, for example, a technology that is commonly called quantum cryptography or quantum key distribution (QKD).

In quantum key distribution, routing is performed in order to share an application key among the nodes constituting a key sharing network. That is, the transfer of an application key is done via a plurality of nodes. Accordingly, in a quantum cryptographic communication system, it is desirable to perform efficient routing while avoiding consumption and depletion of the link keys that are used in transferring an application key.

DETAILED DESCRIPTION

Figure 1:
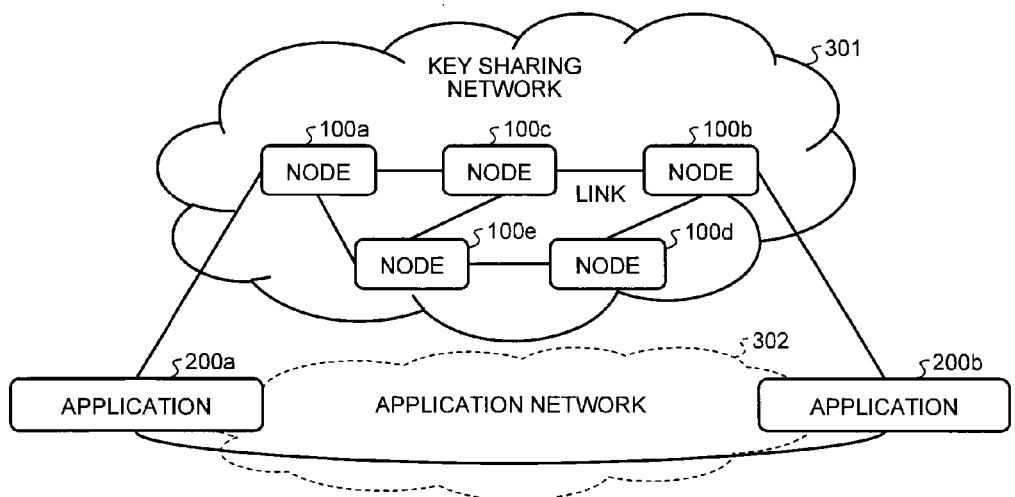
FIG. 1 is a diagram illustrating a configuration example of a communication system according to an embodiment.

According to an embodiment, a communication device is connected to a first network and a second network. The communication device includes a generating unit and a converting unit. The generating unit is configured to generate a first set of route information that is route information of the first network. The converting unit is configured to convert the first set of route information, and generate a second set of route information that is route information of the second network.

An exemplary embodiment of a communication device according to the invention is described below in detail with reference to the accompanying drawings.

In a key sharing network, nodes are used to safely share an application key while performing encryption using link keys. When a particular node exchanges an application key with another node, a routing protocol is used to determine which route (link) in the network should be used to transfer that application key. The routing protocol calculates the most suitable communication route for the purpose of inter-node communication on the basis of cost information assigned to the links. Moreover, if a dynamic routing protocol is used, it also becomes possible to calculate an alternative route in view of a case in which a failure occurs in a particular route (link) or a particular node during the system operations. As far as a routing protocol used for such a purpose is concerned, the operation shortest path first (OSPF) protocol is known.

The mechanism of a routing protocol such as the OSPF protocol is such that network information is mutually exchanged among nodes using a message called the link state advertisement (LSA) via a target link (interface) for routing, and a communication route is calculated at each node.

Consider a package in which, while sending and receiving data via relevant links, the nodes constantly consume link keys, encrypt data, and communicate the encrypted data. In such a package, a situation occurs in which the link keys are consumed also due to the LSA communication performed for the purpose of operating a routing protocol.

As a result, additionally, in the case of a routing method in which the remaining quantity of link keys is used as part of the cost information, the routing metric undergoes a change for the purpose of data exchange necessary for the routing itself. Besides, in the case of a routing method in which the remaining quantity of link keys is used as part of the cost information, the cost information varies more frequently as compared to general routing. For that reason, it becomes necessary to exchange network information more frequently as compared to the existing protocols. That results in an adverse effect in the form of an increase in the link key consumption.

Meanwhile, in a key sharing network, apart from cryptographic links, there also exist non-cryptographic links. A cryptographic link points to a link that uses an interface meant for exchanging an application key while consuming and encrypting link keys. In contrast, a non-cryptographic link points to a link that uses an interface meant for exchanging control information or management information among the nodes.

In a key sharing network, it is assumed that two types of networks (links), namely, cryptographic links and non-cryptographic links are present and, for example, the network configuration (connection configuration) of the two networks perfectly matches with each other. That is, the network of nodes configured with cryptographic links and the network of nodes configured with non-cryptographic links have identical configurations. A node needs to maintain route information regarding both types of networks. However, as far as the software running in a node is concerned; the existing resources wish to run the software that uses normal socket communication. Hence, it is desirable that the network communication performed using cryptographic links as well as the network communication performed using non-cryptographic links is performed via IP interfaces that can be used by normal socket interfaces.

According to the embodiment, in a key sharing network configured with nodes, a routing technique is implemented in such a way that, while maintaining the routing of a network including cryptographic links as well as the routing of a network including non-cryptographic links, link keys are not consumed during the exchange of packets that is done with the aim of implementing a routing protocol.

FIG. 1 is a diagram illustrating a configuration example of a communication system according to the embodiment. Herein, FIG. 1 illustrates an example of a case in which nodes and applications are implemented independent of each other. The communication system includes nodes 100a to 100e that function as communication devices; and includes applications 200a and 200b.

When there is no need to distinguish between the nodes 100a to 100e, they are simply referred to as nodes 100. Similarly, when there is no need to distinguish between the applications 200a and 200b, they are simply referred to as applications 200. Meanwhile, the number of nodes 100 is not limited to five, and the number of applications 200 is not limited to two.

As described above, each of the nodes 100a to 100e has the function of generating and sharing a random number with respective opposite nodes; as well as has the function of using the generated random number as a link key and transferring an application key, which is a separately-generated random number, over a key sharing network 301 by repeatedly performing encryption and decryption so as to mutually share the application key. The applications 200a and 200b obtain application keys from the nodes 100 and perform cryptographic communication using the application keys over an application network 302.

Figure 2:
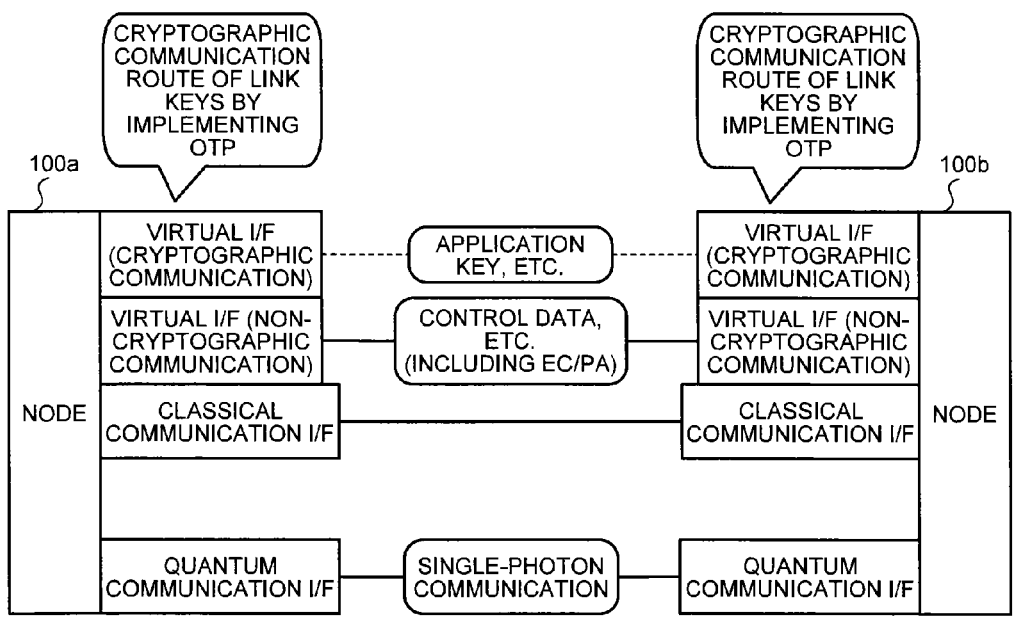
FIG. 2 is a diagram illustrating an example of the connection configuration among a plurality of nodes according to the embodiment.

FIG. 2 is a diagram illustrating an example of the connection configuration among a plurality of nodes 100 (among the nodes 100a and 100b).

As an example, a plurality of nodes 100 is connected by a physical link (a photon communication link) for performing single-photon communication and a physical link (a classical communication link) for performing classical data communication.

A quantum communication interface (I/F), which is in charge of performing communication using a photon communication link, communicates with the adjacent nodes 100 for generating link keys. A classical communication I/F is in charge of the normal data communication.

A classical communication link includes two virtual links, namely, a management link and an application key link. The management link is used in exchanging control data and management data with a plurality of nodes 100. The application key link is used in exchanging application keys via the nodes 100 with the use of cryptographic communication in which link keys are used.

Herein, the application key link corresponds to a network that is encrypted by key information which is consumed after every instance of data exchange. The management link corresponds to a network in which such encryption is not performed. However, the management link can be a network that is encrypted using a different encryption method from the encryption method of the application key link. Alternatively, the configuration can be such that the application key link performs encryption as well as data authentication using link keys, while the management link performs only data authentication using link keys.

A virtual I/F (non-cryptographic communication) is an interface in charge of performing communication using the management link. In contrast, a virtual I/F (cryptographic communication) is an interface in charge of performing communication using the application key link. Herein, there is no particular restriction on the cryptographic algorithm applied to the virtual I/F (cryptographic communication). For example, a block cipher such as the advanced encryption standard (AES) can be used, or a Vernam cipher such as the one-time pad (OTP) can be used.

The communication performed using the application key link points to communication of data that is constantly encrypted using link keys. For that reason, the application key link is also referred to as a cryptographic link. When a computer program installed in a node 100 performs data communication using the cryptographic link, the data is encrypted in the cryptographic link using link keys and the encrypted data reaches the destination node 100 that is directly connected to the source node 100. Upon reaching the destination node 100, the data is decrypted in that node 100 using a link key. In this way, encryption and decryption using link keys is performed in a repeated manner while sending an application key via the nodes 100. Hence, it becomes possible for the nodes 100 to safely share the application key. Although an application key is a typical example of the data exchanged via the cryptographic link, it is also possible to exchange other control information via the cryptographic links.

In contrast, the communication performed using the management link points to communication of unencrypted data. Hence, the management link is also called a non-cryptographic link. When a computer program installed in a node 100 performs data communication using the non-cryptographic link, the data is transferred among the nodes 100 via the non-cryptographic link and reaches the destination node 100. Herein, since encryption using link keys is not performed, the data communication cannot be said to be safe. Typical examples of the data exchanged using the non-cryptographic link include management information or error correction/privacy amplification (EC/PA) that is the classical communication necessary for sharing link key information. However, it is also possible to exchange other information via the management links.

Meanwhile, the connection configuration illustrated in FIG. 2 is only exemplary. Alternatively, a link other than the links illustrated in FIG. 2 can also be present, or the abovementioned two virtual links can be implemented as two different physical links.

Figure 3:
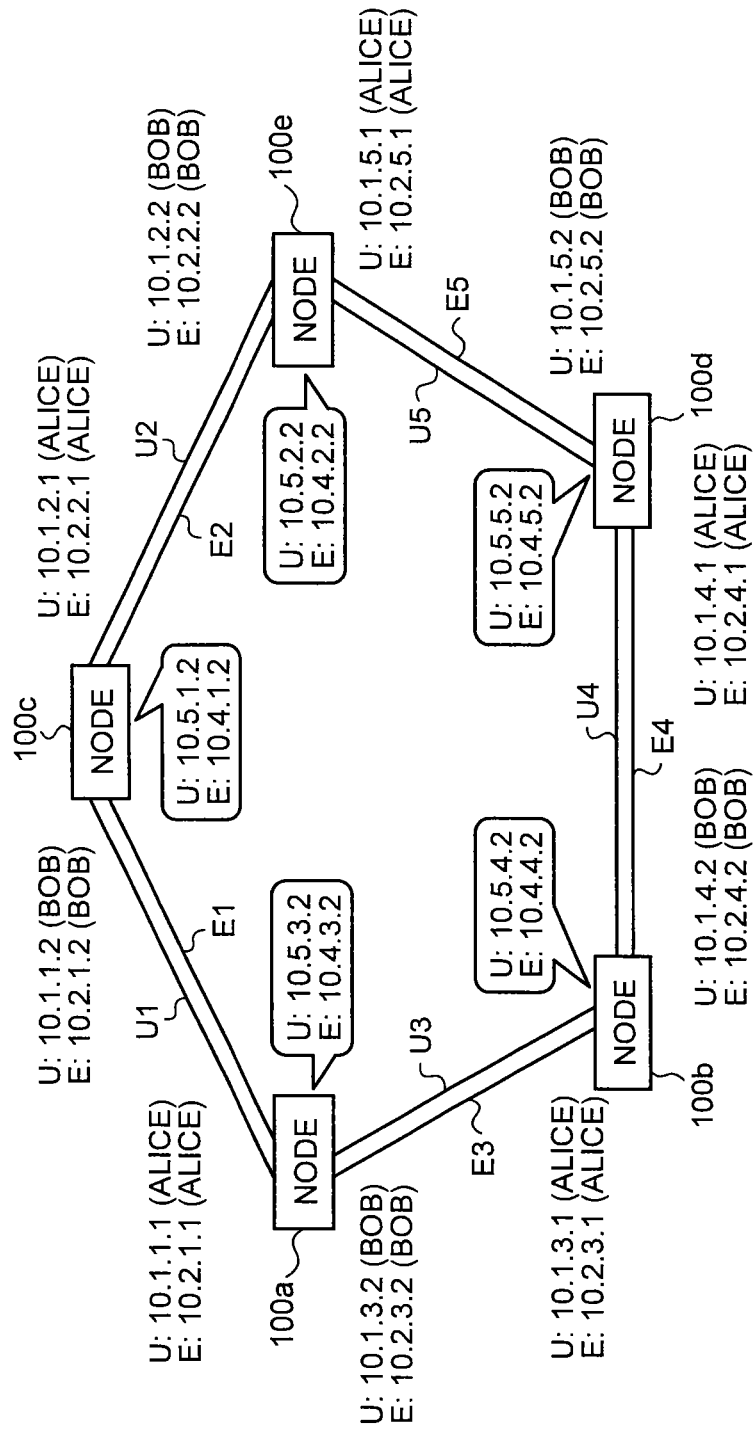
FIG. 3 is a diagram illustrating a configuration example of a key sharing network according to the embodiment.

FIG. 3 is a diagram illustrating a detailed configuration example of the key sharing network according to the embodiment. As illustrated in FIG. 3, a plurality of nodes 100 (the nodes 100*a* to 100*e*) is connected by cryptographic links and non-cryptographic links. With reference to FIG. 3, U1 to U5 represent non-cryptographic links, and E1 to E5 represent cryptographic links.

Herein, the network including cryptographic links and the network including cryptographic links have the same connection configuration. In FIG. 3 is illustrated a network including five nodes (the nodes 100*a* to 100*e*). However, the number of nodes 100 is not limited to five. Moreover, in FIG. 3 is illustrated a configuration in which each node 100 is connected to two different nodes 100 by links. However, alternatively, each node 100 can be connected to any number of different nodes 100, other than two different nodes 100, by links.

Herein, the explanation is given about an exemplary method of assigning IP addresses to each node 100. Since there exist cryptographic links as well as non-cryptographic links, each node 100 needs to perform data communication by separately using the cryptographic links and the non-cryptographic links. For that reason, two types of IP addresses are used: IP addresses assigned to cryptographic links (cryptographic link IP addresses); and IP addresses assigned to non-cryptographic links (non-cryptographic link IP addresses).

When a node 100 is connected to a plurality of different nodes 100 by links; it becomes necessary to have an IP address independent of individual links instead of using an IP addresses specific to a particular link. In a node 100, when a computer program for sending and receiving an application key runs, the abovementioned IP address, which is independent of individual links, is used as the source IP address or the destination IP address at the time when the computer program sends or receives some kind of data. This IP address is hereinafter called a representative address. Moreover, a representative address that is used as the source IP address and the destination IP address by a computer program running in a node 100 for the purpose of performing cryptographic data communication with another node 100 via the cryptographic link is referred to as a cryptographic representative IP address. Furthermore, a representative address that is used as the source IP address and the destination IP address by a computer program in a node 100 for the purpose of performing non-cryptographic data communication with another node 100 via the non-cryptographic link is referred to as a non-cryptographic representative IP address.

The use of representative addresses helps in the following way. If some kind of a failure occurs in a link directly connected to a node 100, then that node 100 can communicate with the destination node 100 via a different link while avoiding the location at which the failure has occurred. Conversely, if it is assumed that link IP addresses are used as the source IP addresses and the destination IP addresses, then the data communication between the nodes 100 gets confined to the specified link. Thus, for example, even if a failure occurs in that link, the communication cannot be continued via an alternative route.

To sum up the explanation given above, there are four types of IP addresses used by each node 100.

(1) A cryptographic link IP address that is assigned to a link and is used during cryptographic data communication.
(2) A non-cryptographic link IP address that is assigned to a link and is used during non-cryptographic data communication.
(3) A cryptographic representative IP address that is assigned to the node 100 independent of the links and that is specified as the source address and the destination address at the time when a computer program running in the node 100 performs cryptographic data communication.
(4) A non-cryptographic representative IP address that is assigned to the node 100 independent of the links and that is specified as the source address and the destination address at the time when a computer program running in the node 100 performs non-cryptographic data communication.

Herein, it is right in thinking that, in each node 100, the number of IP addresses mentioned in (1) and (2) is equal to the number of other nodes 100 to which the node 100 is connected by links.

Given below is further explanation about the details of IP address assigning rules illustrated in FIG. 3. Firstly, unique link numbers are assigned to the links among the nodes 100. In the example illustrated in FIG. 3, the link numbers are assigned in the following manner. Meanwhile, regardless of the cryptographic links and non-cryptographic links, the link numbers are assigned in the same manner.

a link between the node 100*a* and the node 100*c*: link number 1
a link between the node 100*c* and the node 100*e*: link number 2
a link between the node 100*a* and the node 100*b*: link number 3
a link between the node 100*b* and the node 100*d*: link number 4
a link between the node 100*d* and the node 100*e*: link number 5

Given below is the explanation about the assigning rules for assigning link IP addresses (cryptographic link IP addresses and non-cryptographic link IP addresses). In the example illustrated in FIG. 3, each link IP address has the format "10.x.y.z". Herein, "x" takes the value "1" when the link IP address is a non-cryptographic link IP address but takes the value "2" when the link IP address is a cryptographic link IP address. Moreover, "y" represents the link number of the link. Furthermore, as far as "z" is concerned, when quantum key distribution is being performed in a node 100 and a quantum communication I/F, "z" takes the value "1" when the node 100 is a photon transmission apparatus (commonly called Alice) but takes the value "2" when the node 100 is a photon receiver (commonly called Bob). According to such assigning rules, unique IP addresses are assigned to all link addresses.

In FIG. 3, the addresses having the format of "U:10.x.y.z (Alice or Bob)" represent the non-cryptographic link IP addresses assigned to the nodes 100. Similarly, the addresses having the format of "E:10.x.y.z (Alice or Bob)" represent the cryptographic link IP addresses assigned to the nodes 100.

Given below is the explanation about the assigning rules for assigning representative IP addresses (cryptographic representative IP addresses and non-cryptographic representative IP addresses). Herein, each representative IP address also has the format of "10.x.y.z". Herein, "x" takes the value "4" when the representative address is a representative cryptographic IP address but takes the value "5" when the representative address is a representative non-cryptographic IP address. Moreover, "y" represents the link number of the Bob-side link of the node 100. However, if the node 100 is directly connected to more than two other nodes 100, that is, if the node 100 is functioning as a plurality of Bob apparatuses; then the smallest of the link numbers is selected as "y". Furthermore, "z" is always set to be "2". According to such assigning rules, unique IP addresses are assigned to all representative addresses.

In FIG. 3, the address in the format of "U:10.x.y.z" specified in each word balloon represents a non-cryptographic representative IP address assigned to a node 100. Similarly, the address in the format of "E:10.x.y.z" specified in each word balloon represents a non-cryptographic representative IP address assigned to a node 100.

The address assigning method explained till now is only exemplary, and it is not the only possible method. As described later, it is also possible to implement an address assigning method that is conditional on the following criteria: in each node 100, the information about the cryptographic link IP address can be calculated from the information about the non-cryptographic link IP address using a simple conversion method; and the information about the cryptographic representative IP address can be calculated from the information about the non-cryptographic representative IP address using a simple conversion method.

Figure 4:
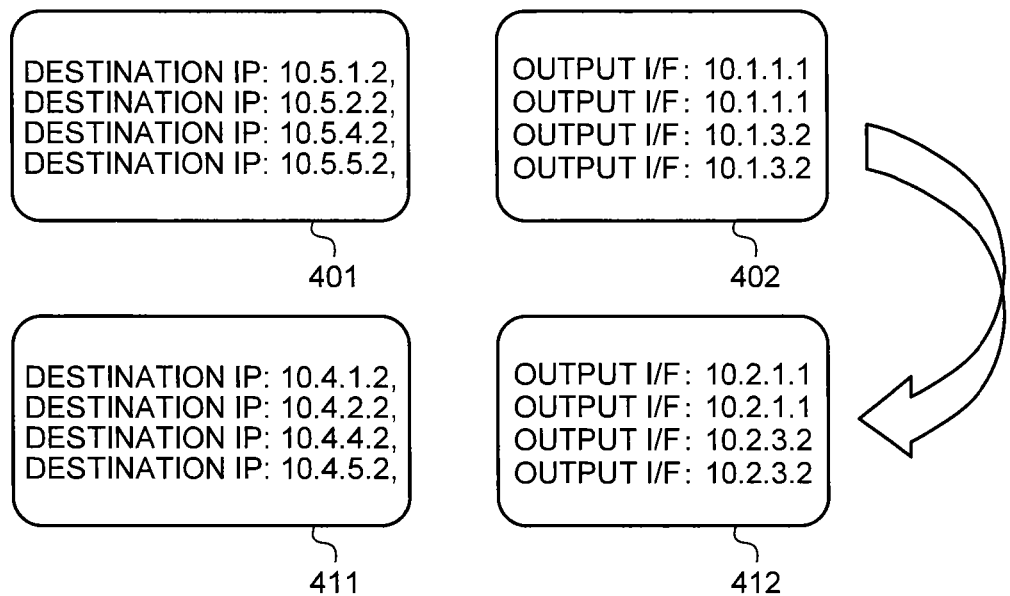
FIG. 4 is a diagram illustrating an example of route information held by a node according to the embodiment.

Explained below with reference to FIG. 4 is a routing address setting method implemented in a node 100 to ensure that inter-node sharing of a secure application, for which a cryptographic representative IP address is specified, can be performed without consuming link keys (i.e., without performing data exchange via a cryptographic link). FIG. 4 is a diagram illustrating an example of route information (such as a routing table) held by the node 100a.

In the embodiment, it is possible implement an arbitrary routing protocol. The following explanation is given for an example in which the OSPF protocol is implemented. In the OSPF protocol, each node 100 performs data exchange by sending and receiving data called LSA via a target network interface for routing; understands the network configuration; and determines the routing.

Herein, it is necessary to have two types of routing paths, namely, a routing path for cryptographic communication and a routing path for non-cryptographic communication. In order to earnestly implement those routing paths, it is necessary to run a plurality of (two) programs of a routing protocol such as the OSPF protocol in the same node (request A). Moreover, at the time of creating a routing path for cryptographic communication, usually LSA is exchanged between the links of the nodes 100 via cryptographic link IP addresses and the routing path is created. For that reason, during LSA communication using a cryptographic link, link keys get consumed. In that regard, at the time of creating a routing path of cryptographic routes, it is desirable to have a method by which LSA communication using a cryptographic link is not performed so as to be able to avoid consumption of link keys (request B).

The following explanation is given about the request A. The configuration regarding the request A is not allowed in the existing OSPF implementation. On the other hand, if a technology called virtual routing and forwarding (VRF) mentioned in Cisco Systems White Paper: Network Virtualization for the Campus, 2006 Cisco Systems, Inc. is used, it becomes possible to virtually operate a plurality of virtual routers in a single node 100. With the use of such a technology, it becomes possible to separately manage the routing path for cryptographic communication and the routing path for non-cryptographic communication. However, in any case, the request B is not satisfied.

The following explanation is given about the request B. The consumption of link keys occurs when the exchange of LSA via a target IP interface for routing is performed usually as a basic operation of a routing protocol such as the OSPF protocol. Given below is the explanation of a method for establishing a routing path for cryptographic communication while avoiding consumption of link keys that occurs due to LSA.

As illustrated in FIG. 4, a routing table is represented by a set that contains information 401 of the destination IP addresses (referred to as "destination IP") and information 402 of the IP addresses to which data should be sent with the aim of delivering the data to the destination (referred to as "output I/F"). For example, in the case of sending data to the destination IP "10.5.1.2" (in the example illustrated in FIG. 3, the node 100c), the node 100a sends data using (the output I/F corresponding to) the non-cryptographic link to which the non-cryptographic link IP address "10.1.1.1" (in the example illustrated in FIG. 3, "U:10.1.1.1 (Alice)") is assigned.

In the embodiment, the routing paths are divided into non-cryptographic communication routing paths and cryptographic communication routing paths. A non-cryptographic communication routing path is a group of sets of routes, each set containing a destination IP (a non-cryptographic representative IP address) and an output I/F (a non-cryptographic link IP address) (in the example illustrated in FIG. 4, the group of the information 401 and the information 402). Similarly, a cryptographic communication routing path is a group of sets of routes, each set containing a destination IP (a cryptographic representative IP address) and an output I/F (a cryptographic link IP address) (in the example illustrated in FIG. 4, a group of information 411 and information 412).

When such routing paths are established, communication in which a non-cryptographic representative IP address is the source and a non-cryptographic representative IP address is the destination reaches the destination via a route containing non-cryptographic link IP addresses. Similarly, communication in which a cryptographic representative IP address is the source and a cryptographic representative IP address is the destination reaches the destination via a route containing cryptographic link IP addresses. As a result, a desired routing is achieved. Meanwhile, in order to achieve such routing, the VRF technology may or may not be used. If the VRF technology is used, then incorrect data communication in which, for example, a cryptographic representative IP address is the source and a non-cryptographic representative IP address is the destination cannot be performed by a computer program running in a node 100. As a result, it becomes possible to enhance the robustness against the vulnerability of computer programs. On the other hand, if it is assumed that the computer programs running in the nodes 100 have no errors (are robust in nature), then there is no difference in the method of using the VRF technology and the method of not using the VRF technology.

Figure 5:
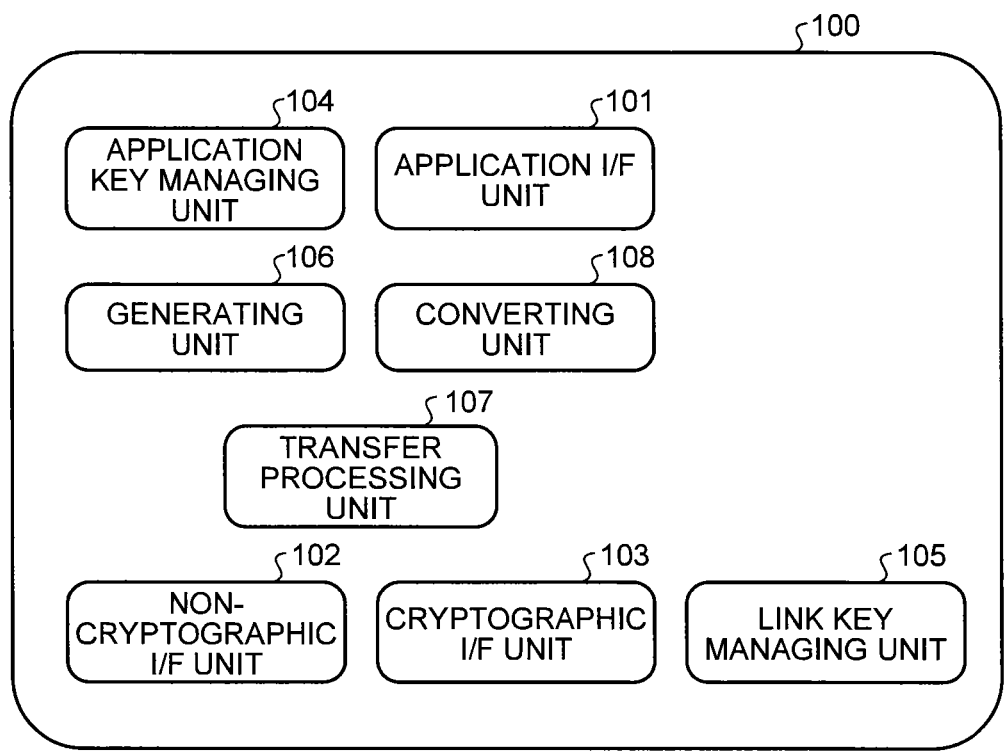
FIG. 5 is a block diagram illustrating a functional configuration of each node according to the embodiment.

FIG. 5 is a block diagram illustrating an exemplary functional configuration of each node 100 according to the embodiment. Each node 100 includes an application I/F unit 101, a non-cryptographic I/F unit 102, a cryptographic I/F unit 103, an application key managing unit 104, a link key managing unit 105, a generating unit 106, a transfer processing unit 107, and a converting unit 108.

The link key managing unit 105 generates and manages (stores therein) a link key. For example, the link key managing unit 105 performs single-photon communication with another node 100 that is directly connected via a quantum communication I/F, and generates and manages a link key for the purpose of encrypting the link communication performed with the other node 100.

The cryptographic I/F unit 103 is an interface for performing cryptographic communication. For example, at the time of sending or receiving data, the cryptographic I/F unit 103 performs encryption or decryption using the link key managed by the link key managing unit 105. Moreover, with respect to upper level modules, the cryptographic I/F unit 103 provides an interface such as the normal socket interface. For that reason, the application 200 that performs cryptographic communication using the cryptographic I/F unit 103 need not be altered in particular. Meanwhile, the cryptographic I/F unit 103 has a cryptographic link IP address given thereto.

The non-cryptographic I/F unit 102 is an interface for performing non-cryptographic communication. The non-cryptographic I/F unit 102 does not perform encryption and decryption using a link key. Moreover, with respect to upper level modules, the non-cryptographic I/F unit 102 provides an interface such as the normal socket interface. For that reason, the application 200 that performs cryptographic communication using the non-cryptographic I/F unit 102 need not be altered in particular. Meanwhile, the non-cryptographic I/F unit 102 has a non-cryptographic link IP address given thereto.

In FIG. 5, although a single link key managing unit 105, a single cryptographic I/F unit 103, and a single non-cryptographic I/F unit 102 are illustrated; a node 100 that is connected to a plurality of other nodes 100 by a plurality of links may include those constituent elements in plurality.

The transfer processing unit 107 sends and receives data (such as packets) for the purpose of data transfer. The transfer processing unit 107 refers to the routing tables generated by the generating unit 106 and the converting unit 108, and sends and receives packets for the purpose of packet transfer.

The generating unit 106 executes a routing protocol such as the OSPF protocol and generates routing information of non-cryptographic routes (generates a routing table). Moreover, the generating unit 106 executes a routing protocol with respect to non-cryptographic routes. According to the mechanism of the routing protocol, the generating unit 106 dynamically generates a routing table.

The converting unit 108 refers to the routing table of non-cryptographic routes that is held by the transfer processing unit 107, and generates a routing table of cryptographic routes by converting at least a portion of the information specified in the routing table of non-cryptographic routes.

The application key managing unit 104 holds and manages an application key which was exchanged via a cryptographic route while being encrypted with the use of link keys.

The application I/F unit 101 is an interface for communicating with an application (such as the application 200) that establishes connection with another node 100 and performs cryptographic data communication using an application key. The node 100 receives a request for an application key from the application 200 via the application I/F unit 101, and provides an application key to the application 200.

Meanwhile, the application I/F unit 101, the non-cryptographic I/F unit 102, the cryptographic I/F unit 103, the application key managing unit 104, the link key managing unit 105, the generating unit 106, the transfer processing unit 107, and the converting unit 108 can be implemented by executing computer programs in a processor such as a central processing unit (CPU), that is, can be implemented using software; or can be implemented using hardware such as an integrated circuit (IC); or can be implemented using a combination of software and hardware.

Figure 6:
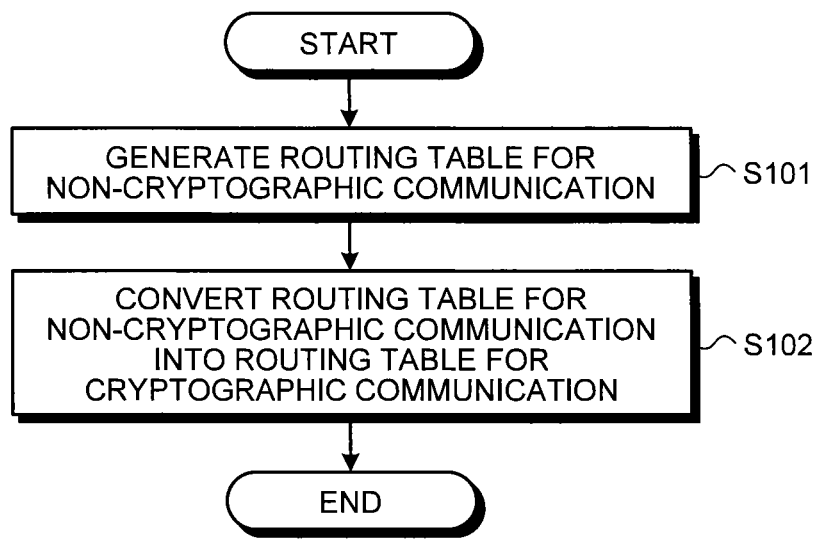
FIG. 6 is a flowchart for explaining a route information generating operation according to the embodiment.

Explained below with reference to FIG. 6 is a route information generating operation performed by the node 100 that is configured in the abovementioned manner according to the embodiment. FIG. 6 is a flowchart for explaining an example of the route information generating operation according to the embodiment.

Firstly, the generating unit 106 specifies non-cryptographic representative IP addresses and a subnet of non-cryptographic representative IP addresses, and initializes the OSPF routing protocol. As a result, route information of non-cryptographic communication is generated (i.e., a routing table is generated) (Step S101).

Once the route information of non-cryptographic communication (i.e., the routing table) is generated, the converting unit 108 generates route information of cryptographic communication (i.e., generates a routing table) from the route information of non-cryptographic communication (i.e., from the routing table) (Step S102). The sequence (S101 and S102) can be repeated.

In the example illustrated in FIG. 4, the converting unit 108 generates the route information of cryptographic communication by following, for example, the sequence given below.

(1) For each non-cryptographic communication route, the converting unit 108 obtains the non-cryptographic representative IP address that is the destination IP address (in FIG. 4, illustrated as "destination IP) and obtains the non-cryptographic link IP address that is the output destination IP address (in FIG. 4, illustrated as "output IP). The converting unit 108 repeatedly performs this acquisition operation for all non-cryptographic communication routes.

(2) The converting unit 108 converts the obtained route information according to rules specified below from (a) to (c).

(a) In the non-cryptographic representative IP address, the portion of "x" in "10.x.y.z" is converted from "5" to "4" and the post-conversion IP address is held as a cryptographic representative IP address.

(b) In the non-cryptographic link IP address, the portion of "x" in "10.x.y.z" is converted from "1" to "2" and the post-conversion IP address is held as a cryptographic link IP address.

(c) A route is generated that includes the set of the cryptographic representative IP address that has been held and the cryptographic link IP address that has been held, and the route is set in a routing table. Herein, the routing table that is set corresponds to the routing path in the route for cryptographic communication.

In this way, in the embodiment, a routing table of non-cryptographic routes is generated using a dynamic routing protocol such as the OSPF protocol. Then, the routing table of non-cryptographic routes is used to generate a corresponding routing table of cryptographic routes (without directly using a dynamic routing protocol). Meanwhile, it is anticipated that there is a delay in updating the routing table of non-cryptographic routes and the routing table of cryptographic routes. In that case, for example, during the conversion operation performed by the converting unit 108, the transfer processing unit 107 can perform the control to stop data routing (data transfer).

Meanwhile, there is no particular restriction on the information used in the routing metric in a non-cryptographic route. For example, as the cost information of non-cryptographic links, it is possible to perform optimization by using the cost information of cryptographic links (such as the remaining quantity of link keys). As a result, the routing table of cryptographic routes that is generated after the conversion represents the routes based on the cost information of cryptographic links.

As described above, according to the embodiment, it becomes possible to perform routing in an efficient manner while avoiding consumption and depletion of link keys.

Figure 7:
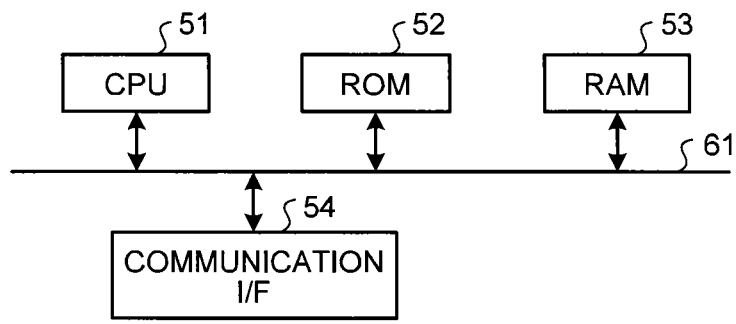
FIG. 7 is an explanatory diagram of a hardware configuration of a communication device according to the embodiment.

Explained below with reference to FIG. 7 is a hardware configuration of the communication device according to the embodiment. FIG. 7 is an explanatory diagram of a hardware configuration of the communication device according to the embodiment.

The communication device according to the embodiment includes a control device such as a central processing unit (CPU) 51; memory devices such as a read only memory (ROM) 52 and a random access memory (RAM) 53; a communication I/F 54 that performs communication by establishing connection with a network; and a bus 61 that connects the constituent elements to each other.

Meanwhile, the computer programs executed in the communication device according to the embodiment are stored in advance in the ROM 52.

Alternatively, the computer programs executed in the communication device according to the embodiment can be recorded in the form of installable or executable files in a computer-readable recording medium such as a compact disk read only memory (CD-ROM), a flexible disk (FD), a compact disk readable (CD-R), or a digital versatile disk (DVD); and can be provided as a computer program product.

Still alternatively, the computer programs executed in the communication device according to the embodiment can be saved as downloadable files on a computer connected to the Internet or can be made available for distribution through a network such as the Internet.

Meanwhile, the computer programs executed in the communication device according to the embodiment can make a computer function as the constituent elements of the above-mentioned communication device. In that computer, the CPU 51 reads the computer programs from a computer-readable memory medium and runs them such that the computer programs are loaded in a main memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device connected to a first network in which nodes are connected and a second network in which the nodes are connected, the communication device comprising:
   a generating unit configured to generate a first set of route information that is route information of the first network by communicating with nodes over the first network;
   a converting unit configured to convert the first set of route information to a second set of route information that is route information of the second network by converting at least a portion of addresses in the first set of route information, without communicating with nodes over the second network; and
   a storage configured to store key information that is consumed after every instance of data exchange, wherein
   the first network is used to share the key information between the nodes,
   the storage stores the key information that is shared by using the first network, and
   the second network is used for cryptographic communication between the nodes using the key information that is stored in the storage.

2. The device according to claim 1, wherein
   the first set of route information contains addresses in the first network,
   the second set of route information contains addresses in the second network, and
   the converting unit is configured to generate the second set of route information that contains converted addresses in the first network.

3. The device according to claim 1, wherein
   the second network is encrypted and subjected to data authentication with the key information, and
   the first network is subjected to data authentication with the key information.

4. The device according to claim 1, wherein the generating unit is configured to generate the first set of route information using cost information assigned to each of a plurality of links included in the second network.

5. The device according to claim 1, further comprising a transfer processing unit configured to stop a data transfer operation while the converting unit is generating the second set of route information.

6. The device according to claim 1, wherein
   the first set of route information contains first-type link addresses, which are assigned to a plurality of links included in the first network, and first-type representative addresses, which are used as at least either destinations or sources in the first network,
   the second set of route information contains second-type link addresses, which are assigned to a plurality of links included in the second network, and second-type representative addresses, which are used at least as either destinations or sources in the second network, and
   the converting unit is configured to
      convert the first-type link addresses into the second-type link addresses, and
      convert the first-type representative addresses into the second-type representative addresses.

7. The device according to claim 1, further comprising:
   a quantum communication interface configured to communicate with another device using a photon communication link.

8. A communication system comprising:
   a plurality of communication devices connected to a first network in which nodes are connected and a second network in which the nodes are connected, wherein
   each of the communication devices includes
      a generating unit configured to generate a first set of route information that is route information of the first network by communicating with nodes over the first network;

a converting unit configured to convert the first set of route information to a second set of route information that is route information of the second network, by converting at least a portion of addresses in the first set of route information, without communicating with nodes over the second network; and a storage configured to store key information that is consumed after every instance of data exchange, wherein the first network is used to share the key information between the nodes, the storage stores the key information that is shared by using the first network, and the second network is used for cryptographic communication between the nodes using the key information that is stored in the storage.

9. A communication method implemented in a communication device that is connected to a first network in which nodes are connected and a second network in which the nodes are connected, the communication method comprising:

generating a first set of route information that is route information of the first network by communicating with nodes over the first network; and converting the first set of route information to a second set of route information that is route information of the second network, by converting at least a portion of addresses in the first set of route information, without communicating with nodes over the second network, the second network being encrypted with key information that is consumed after every instance of data exchange and that is stored in a storage, the first network being used to share the key information between the nodes, the storage storing the key information that is shared by using the first network, and the second network being used for cryptographic communication between the nodes using the key information that is stored in the storage.

* * * * *